US008046277B2

(12) United States Patent
Zhu et al.

(10) Patent No.: US 8,046,277 B2
(45) Date of Patent: Oct. 25, 2011

(54) METHODS AND SYSTEMS FOR MANAGING RECONCILIATION AND WRITE-OFF IN AN ACCRUAL ACCOUNTING ENVIRONMENT

(75) Inventors: Rixin Zhu, Cupertino, CA (US); Vinayak Kamath, San Mateo, CA (US); Gary Wu, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1436 days.

(21) Appl. No.: 11/361,831

(22) Filed: Feb. 23, 2006

(65) Prior Publication Data
US 2007/0198376 A1    Aug. 23, 2007

(51) Int. Cl.
*G07F 7/10*   (2006.01)
(52) U.S. Cl. ............................................ 705/33; 705/30
(58) Field of Classification Search ............... 705/30–33
See application file for complete search history.

(56) References Cited

U.S. PATENT DOCUMENTS

| | | | | |
|---|---|---|---|---|
| 6,343,279 B1 * | 1/2002 | Bissonette et al. | ............. | 705/41 |
| 6,381,587 B1 * | 4/2002 | Guzelsu | ............. | 705/40 |
| 6,532,450 B1 * | 3/2003 | Brown et al. | ............. | 705/40 |
| 7,194,431 B1 * | 3/2007 | Land et al. | ............. | 705/30 |
| 7,340,421 B1 * | 3/2008 | Marcial et al. | ............. | 705/30 |
| 7,536,325 B2 * | 5/2009 | Randell et al. | ............. | 705/30 |
| 7,539,634 B2 * | 5/2009 | Goodbody et al. | ............. | 705/30 |
| 2003/0135461 A1 * | 7/2003 | Brown et al. | ............. | 705/40 |
| 2005/0171873 A1 | 8/2005 | Alberti et al. | | |

OTHER PUBLICATIONS

Oracle Cost Management User's Guide, Release 11i, Part No. A75088-04, Mar. 2004 (4pgs).
Oracle Payables User's Guide, Release 11i, Part No. A81180-07, May 2005 (3pgs).
Oracle Purchasing User's Guide, Release 11i, Part No. A82913-06, Sep. 2004.

* cited by examiner

*Primary Examiner* — Ramsey Refai
(74) *Attorney, Agent, or Firm* — Kilpatrick Townsend & Stockton LLP (57) ABSTRACT

A computer-implemented method of managing reconciliation and write-off data in an accrual-based accounting environment may include steps of retrieving a plurality of transactions associated with a predetermined purchase order from a database coupled to a computer network; calculating an aggregate accrual balance of the retrieved plurality of transactions and associating the calculated aggregate accrual balance with a unique first identifier; when the aggregate accrual balance associated with the unique first identifier indicates that the predetermined purchase order is unbalanced, loading a first reconciliation table with first reconciliation information and storing the first reconciliation table in the database; enabling writing-off the aggregate accrual balance, and when the aggregate accrual balance has been written-off, removing the first reconciliation information from the first reconciliation table and storing the first reconciliation table in the database.

18 Claims, 7 Drawing Sheets

FIG. 1

102 — Receive 10 Qty
Cr. Accrual Acct — 106        100
104 — Dr. Receiving Inspection Acct    100

Invoice 9 Qty — 108
Cr. Accounts Payable         90 — 110
Dr. Accrual Acct             90 — 112

Need to write-off the balance ($10) — 114
from accrual account

Dr. Accrual Acct.            10 — 116
Cr. Offset Acct              10 — 118

First period: Jan-2005

| Accrual Account (202) | PO Num (204) | TX Date (208) | TX Source (210) | Receipt Num (212) | Invoice Num (214) | Qty (216) | Amount (218) | Write Off Flag (220) |
|---|---|---|---|---|---|---|---|---|
| ACCT#1 | PO#1 | 1/1/2005 | Receipt | R#1 |      | 5 | -50 |   | — 238 |
| ACCT#1 | PO#1 | 1/31/2005 | Invoice |     | V#1 | 5 | 50 |   | — 240 |
| ACCT#1 | PO#2 | 1/1/2005 | Receipt | R#2 |      | 5 | -50 |   |
| ACCT#1 | PO#2 | 1/31/2005 | Invoice |     | V#2 | 4 | 40 |   |

Second period: Feb-2005

| Accrual Account (202) | PO Num (204) | TX Date (208) | TX Source (210) | Receipt Num (212) | Invoice Num (214) | Qty (216) | Amount (218) | Write Off Flag (220) |
|---|---|---|---|---|---|---|---|---|
| ACCT#1 | PO#1 | 1/1/2005 | Receipt | R#1 |      | 5 | -50 |   | — 222 |
| ACCT#1 | PO#1 | 1/31/2005 | Invoice |     | V#1 | 5 | 50 |   | — 224 |
| ACCT#1 | PO#1 | 2/1/2005 | Receipt | R#3 |      | 5 | -50 | Y | — 226 |
| ACCT#1 | PO#1 | 2/28/2005 | Invoice |     | V#3 | 4 | 40 | Y | — 228 |
| ACCT#1 | PO#2 | 1/1/2005 | Receipt | R#2 |      | 5 | -50 | ? | — 230 |
| ACCT#1 | PO#2 | 1/31/2005 | Invoice |     | V#2 | 4 | 40 | ? | — 232 |
| ACCT#1 | PO#2 | 2/1/2005 | Receipt | R#4 |      | 5 | -50 | ? | — 234 |
| ACCT#1 | PO#2 | 2/28/2005 | Invoice |     | V#4 | 6 | 60 | ? | — 236 |

FIG. 2 (Prior Art)

First period: Jan-2005

RECONCILIATION SUMMARY 300

| Accrual Account 302 | PO Num 304 | PO Distribution ID 306 | RCV Balance 308 | AP Balance 310 | WO Balance 312 | Total Balance 314 | Write Off Checkbox 316 |
|---|---|---|---|---|---|---|---|
| ACCT#1 | PO#2 | D#2 | -50 | 40 | 0 | -10 | X |

RECONCILIATION DETAILS 340

| Accrual Account 318 | PO Distribution ID 320 | TX Date 322 | TX Source 324 | Receipt Num 326 | Invoice Num 328 | Write Off ID 330 | Qty 332 | Amount 334 |
|---|---|---|---|---|---|---|---|---|
| ACCT#1 | D#2 | 1/1/2005 | Receipt | R#2 | | | 5 | -50 ←336 |
| ACCT#1 | D#2 | 1/31/2005 | Invoice | | V#2 | | 4 | 40 ←338 |

*FIG. 3*

WRITE OFF SUMMARY 400

| Write Off ID 402 | Accrual Account 404 | PO Num 406 | PO Dist. ID 408 | Write Off Date 410 | Reversal ID 412 | Write Off Type 414 | WO Amount 416 | Write Off Reason 418 | Reverse Checkbox 420 |
|---|---|---|---|---|---|---|---|---|---|
| W#1 | ACCT#1 | PO#2 | D#2 | 1/31/2005 | | write off | 10 | under invoice | |

WRITE OFF DETAILS 440

| Write-Off ID 422 | TX Date 424 | TX Source 426 | Receipt Num 428 | Invoice Num 430 | Qty 432 | Amount 434 |
|---|---|---|---|---|---|---|
| W#1 | 1/1/2005 | Receipt | R#2 | | 5 | -50 ←436 |
| W#1 | 1/31/2005 | Invoice | | V#2 | 4 | 40 ←438 |

*FIG. 4*

WRITE OFF SUMMARY 500

| Write Off ID (492) | Accrual Account (404) | PO Num (406) | PO Dist. ID (408) | Write Off Date (410) | Reversal ID (412) | Write Off Type (414) | WO Amount (416) | Write Off Reason (418) | Reverse Checkbox (420) |
|---|---|---|---|---|---|---|---|---|---|
| W#1 | ACCT#1 | PO#2 | D#2 | 1/31/2005 | | write off | 10 | under invoice | |
| W#2 | ACCT#1 | PO#2 | D#2 | 1/31/2005 | W#1 | write_off reversal | -10 | made a mistake | |

WRITE OFF DETAILS 540

| Write Off ID (422) | TX Date (424) | TX Source (426) | Receipt Num (428) | Invoice Num (430) | Qty (432) | Amount (434) |
|---|---|---|---|---|---|---|
| W#1 | 1/1/2005 | Receipt | R#2 | | 5 | -50 |
| W#1 | 1/31/2005 | Invoice | | V#2 | 4 | 40 |
| W#2 | 1/1/2005 | Receipt | R#2 | | 5 | -50 |
| W#2 | 1/31/2005 | Invoice | | V#2 | 4 | 40 |

FIG. 5

RECONCILIATION SUMMARY 600

| Accrual Account (302) | PO Num (304) | PO Distribution ID (306) | RCV Balance (308) | AP Balance (310) | WO Balance (312) | Total Balance (314) | 316 |
|---|---|---|---|---|---|---|---|
| ACCT#1 | PO#2 | D#2 | -50 | 40 | 0 | -10 | |

RECONCILIATION DETAILS 640

| Accrual Account (318) | PO Distribution ID (320) | TX Date (322) | TX Source (324) | Receipt Num (326) | Invoice Num (328) | Write Off ID (330) | Qty (332) | Amount (334) |
|---|---|---|---|---|---|---|---|---|
| ACCT#1 | D#2 | 1/1/2005 | Receipt | R#2 | | | 5 | -50 (336) |
| ACCT#1 | D#2 | 1/31/2005 | Invoice | | V#2 | | 4 | 40 (338) |
| ACCT#1 | D#2 | 1/31/2005 | Write-off | | | W#1 | 10 | 602 |
| ACCT#1 | D#2 | 1/31/2005 | Write-off reversal | | | W#2 | -10 | 604 |

FIG. 6

Second period: Feb-2005

| RECONCILIATION SUMMARY | | | | | | |
|---|---|---|---|---|---|---|
| 302 | 304 | 306 | 700 308 | 310 | 312 | 314 316 |
| Accrual Account | PO Num | PO Distribution ID | RCV Balance | AP Balance | WO Balance | Total Balance  Write Off Checkbox |
| ACCT#1 | PO#1 | D#1 | -100 | 90 | 0 | -10 |

| RECONCILIATION DETAILS | | | | | | | | |
|---|---|---|---|---|---|---|---|---|
| 318 | 320 | 322 | 740 324 | 326 | 328 | 330 | 332 | 334 |
| Accrual Account | PO Distribution ID | TX Date | TX Source | Receipt Num | Invoice Num | Write Off ID | Qty | Amount |
| ACCT#1 | D#1 | 1/1/2005 | Receipt | R#1 | | | 5 | -50  ←702 |
| ACCT#1 | D#1 | 1/31/2005 | Invoice | | V#1 | | 5 | 50   ←704 |
| ACCT#1 | D#1 | 2/1/2005 | Receipt | R#3 | | | 5 | -50  ←706 |
| ACCT#1 | D#1 | 2/28/2005 | Invoice | | V#3 | | 4 | 40   ←708 |

METHODS AND SYSTEMS FOR MANAGING RECONCILIATION AND WRITE-OFF IN AN ACCRUAL ACCOUNTING ENVIRONMENT

BACKGROUND OF THE INVENTION

1. Field of the Invention

The present invention relates to the field of computer-implemented methods and systems for managing reconciliation and write-offs in an accrual accounting environment.

2. Description of the Prior Art and Related Information

Most companies in the business world use the accrual-based accounting method. When goods are purchased and received, the accrual account is credited. When an invoice is received that is matched to a Purchase Order (or "PO"), the accrual account is debited for the amount invoiced. If all the receipts and invoices for purchase orders are perfectly matched, the accrual account balance should be zero. These accrual accounts must be reconciled and maintained to ensure that liabilities are properly recorded. The accrual account balance may not be zero due to various business problems (over-receipt, over-invoice, invoice not matched to PO, etc). Under such circumstances, the balance in the accrual account must be written-off so that the company's financials can be correctly stated.

Conventional processes of accrual reconciliation and write-off are labor intensive and error prone. At the outset, the user must load all accounting lines to a table from different sub-ledgers (Receiving, Accounts Payable, Inventory, etc). For a large enterprise, the sheer volume of data that must be loaded is enormous and keeps growing. The user must then download these data into a spreadsheet, where they can be grouped based on the amount, PO number, and transaction date. The user conventionally must then operate inside the spreadsheet to identify the accounting entries that need to be written-off. Each identified accounting line must then be marked as written-off. The net value of the write-offs for every accrual account is then used to create offset journal entries in general ledger. This process is highly labor intensive and leads to low confidence in the accuracy of the financial statements, and may lead to problems vis-à-vis regulatory compliance and is not well adapted to creating a reliable and accurate audit reconciliation and write-off trail. The high level of frustration in conventional reconciliation and write-off process calls for a more streamlined, flexible, scalable, and automated accrual reconciliation and write-off process.

Figure 1:
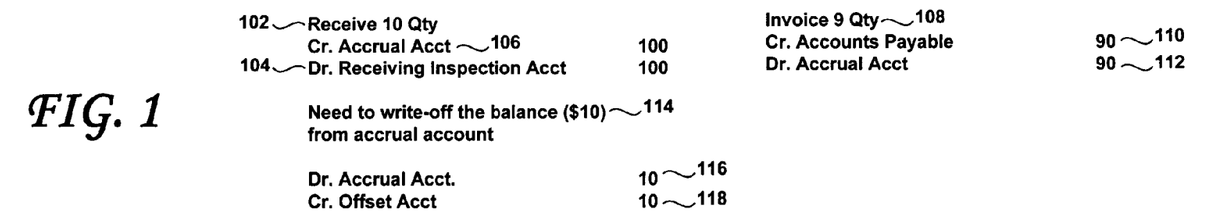
FIG. 1 sets up a hypothetical set of business transactions to illustrate conventional accrual accounting and write-off processes.

FIG. 1 shows a hypothetical set of business transactions to illustrate conventional accrual accounting and write-off processes. In a typical scenario, items may be received at a shipping dock. To keep track of these items, a receiving inspection account may be used. The received items may then be inspected at the dock, and if the items fail inspection, they may be refused and sent back to the originator of the shipment. If the items pass inspection, they may be accepted and the receiving inspection account may be debited and a selected accrual account credited, which creates a liability for the receiving company. In the hypothetical set of business transaction shown in FIG. 1, ten $10 items have been received as shown at 102, and the aggregate value thereof ($100) has been debited to the receiving inspection account, as shown at 104. A selected accrual account is correspondingly credited, as shown at reference numeral 106.

Concurrently or thereafter, an invoice is received for the received items. For whatever reason, the received invoice is for only nine such items, as shown at 108. Therefore, as shown at 110, the account payable account must be credited for the invoiced $90 and the selected accrual account must be correspondingly debited for the invoiced $90, as shown at 112. It is apparent that such transactions result in the need to write-off the balance of $10 from the accrual account (which is an account that is configured to store the enterprise's temporary liabilities) as shown at 114, as the balance in the accrual account is preferably zero. To do so, $10 is debited from the accrual account as shown at 116 and credited to an offset account (an expense account), as shown at 118. This may be done at the end of a predetermined period (e.g., at the end of the month or quarter) or at any selected time.

Figure 2:
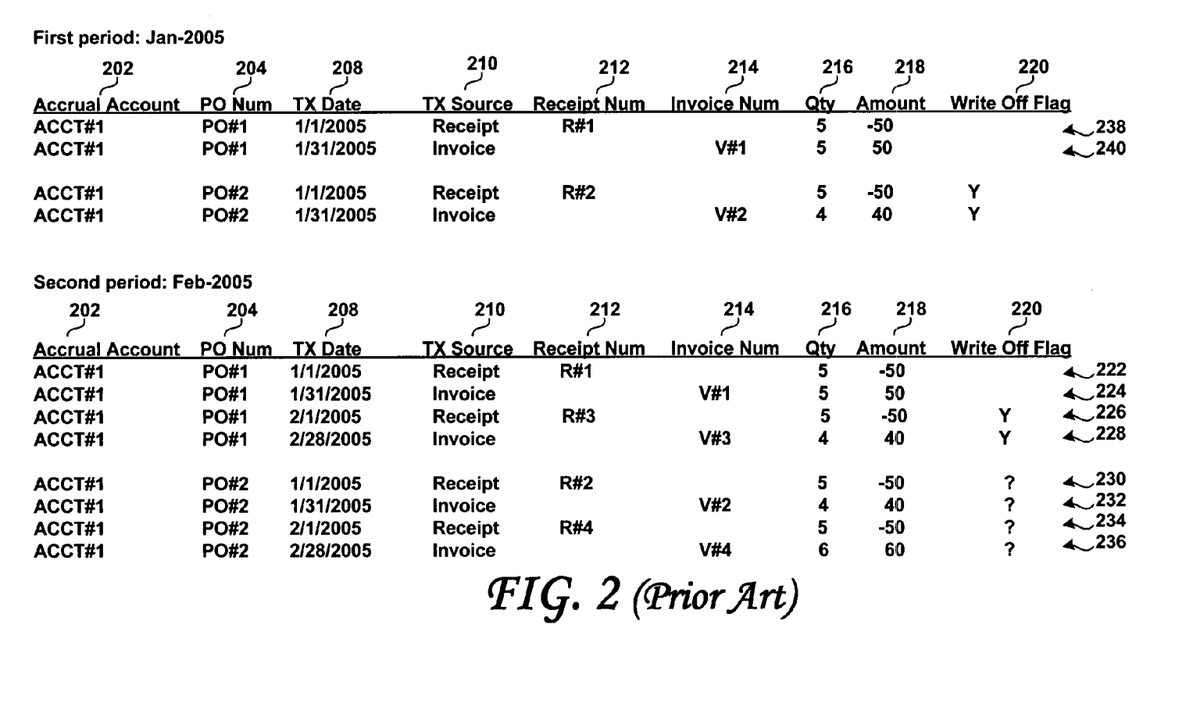
FIG. 2 shows details of conventional accrual accounting and write-off processes over two one-month periods.

The accrual and write-off process described above, while barely adequate for a few transactions, is not scalable and may become unduly burdensome as the number of transactions increase. Such a process is also not readily auditable, suffers from usability issues and is not readily automatable, as shown below relative to FIG. 2, which further illustrates problems associated with the conventional accrual and write-off processes. FIG. 2 assumes that two POs have been issued. PO#1 is for a quantity of ten items at $10 each and PO#2 is also for a quantity of ten items, also at $10 each. The aggregate values of the subject items for both PO#1 and PO#2 are to be distributed to the same accrual account, ACCT#1. POs may include a header, line, shipment and distribution, with the finest granularity being at the distribution level.

FIG. 2 is a table showing the accrual account 202, the PO number 204, the transaction date 208, the transaction source 210, receipt number 212, the invoice number 214, the quantity of items 216, the aggregate amount 218 for the quantity of items in the quantity column 216, and a write-off flag 220. As shown in FIG. 2, the following transactions occurred in January 2005, the first of the two periods considered in FIG. 2. On Jan. 1, 2005, five items were received (the transaction source 210 is "Receipt") and were assigned a receipt number R#1 as shown in the receipt number column 212. Accordingly, $50 was credited to the accrual account ACCT#1, as evidenced by the "−50" entry in the amount column 218. In this exemplary set of transactions, on Jan. 31, 2005, invoice V#1 was received (the transaction source column 210 shows the source of the transaction as being "Invoice"). Invoice V#1 is for five items, which enables the accrual account ACCT#1 to be debited for $50, as noted by the "50" entry in the amount column 218. As these transactions for PO#1 are self-balancing (the received amounts are matched by the invoiced amounts), the balance of accrual account ACCT#1 is zero, and the write-off flag is not asserted, as shown at 220.

As also shown in FIG. 2, during the same first period of January 2005, the first 5 of the 10 items called for by PO#2 were received on Jan. 1, 2005. Accordingly, the accrual account ACCT#1 is credited with this liability; namely $50, as evidenced by the "−50". Thereafter, on Jan. 31, 2005, invoice number V#2 is received. However, received invoice number V#2 is only for $40; namely for 4 items at $10 each, whereas 5 items were received (see receipt number R#1 in column 212). The accrual account ACCT#1, therefore, may only be debited $40. Therefore, PO#2 is not self-balancing, as the accrual account has a positive balance of $10 (for PO#2, it was credited $50 on Jan. 1, 2005 but debited only $40 on Jan. 31, 2005). Therefore, the write-off flag in column 220 is asserted for PO#2, as suggested by the "Y" entry in column 220 for PO#2.

As all of the items ordered through PO#1 and PO#2 have not yet been received as of Feb. 1, 2005, their respective entries are brought forward to February and repeated. That is, rows 222 and 224 of the February 2005 table, corresponding to purchase order number PO#1, are the same as the first two rows of the table for January 2005. Likewise, rows 230 and 232 of the February 2005 table, corresponding to PO#2, are the same as rows three and four of the January 2005 table. As shown in FIG. 2, on Feb. 1, 2005, five items ordered on PO#1 were received and assigned receipt number R#3, as shown at row 226. Accordingly, the accrual account ACCT#1 was credited with the temporary liability of 50, as evidenced by the "−50" entry in the amount column 218. At the end of the month on Feb. 28, 2005, invoice V#3 for the items received on Feb. 1, 2005 was received, as indicated in row 228. However, for some reason, invoice V#3 is only for 4 items; namely $40. As the accrual account ACCT#1 may only be debited for the $40 invoiced by V#3, PO#1, although self-balanced in the first period (January 2005), is now unbalanced in the second period (February 2005). Therefore, the write-off flag is asserted, as shown at column 220.

Turning now to PO#2, five items were received on Feb. 1, 2005, as evidenced by receipt number R#4 at row 234. Therefore, $50 was credited to ACCT#1 on that date. Thereafter, on Feb. 28, 2005, a new invoice V#4 for PO#2 was received as shown at row 236, this time invoicing the recipient for six items, although only five were received during that period. The accrual account ACCT#1 is then debited for $60, as shown in FIG. 2. This over-invoicing may have taken place deliberately to compensate for the under-invoicing on PO#2 of V#2 on Jan. 31, 2005 or for some other reason altogether. Alternatively, the over-invoicing of V#4 may have been accidental. In any case, the status of the write-off flag for PO#2 is now uncertain. Indeed, for PO#2, there are now two alternatives for writing off the January and February 2005 transactions: 1) change the write-off flag for two transactions in January (as PO#2 is now balanced, as the amounts credited to ACCT#1 are matched with corresponding debits) or write off both transactions again in February, as the February transactions (see rows 234, 236) are not self-balancing during that period.

As can be seen from a relatively small number of transactions, according to conventional methods, the entries necessary for reconciliation and write-off of a single accrual account rapidly grow to unmanageable size. Conventionally, even self-balancing POs show up in the table, as seen in the case of PO#1 in January 2005, the first period considered in FIG. 2. Moreover, as can be seen, the manipulation of the write-off flag can be cumbersome. Complicating an already unwieldy table, there may be many individual transactions covered by a single purchase order, and such transactions conventionally add further clutter to the reconciliation and write-off table. Moreover, the format of conventional tables is such that it is not readily auditable and it may be difficult to reconstruct past transactions, as there is no track record kept. From the foregoing, it may be appreciated that improved methods and systems for accrual reconciliation and write-off are needed.

SUMMARY OF THE INVENTION

According to an embodiment thereof, the present invention is a computer-implemented method of managing reconciliation and write-off data in an accrual-based accounting environment. Such a computer-implemented method may include steps of retrieving a plurality of transactions associated with a predetermined purchase order from a database coupled to a computer network; calculating an aggregate accrual balance of the retrieved plurality of transactions and associating the calculated aggregate accrual balance with a unique first identifier. When the aggregate accrual balance associated with the unique first identifier indicates that the predetermined purchase order is unbalanced, the method may include a step of loading a first reconciliation table with first reconciliation information and storing the first reconciliation table in the database. An embodiment of the present invention may include a step of enabling writing-off the aggregate accrual balance, and when the aggregate accrual balance has been written-off, the method may include steps of removing the first reconciliation information from the first reconciliation table and storing the first reconciliation table in the database.

According to further embodiments, the plurality of transactions may originate from sources such as Receiving, Accounts Payable and/or Inventory, for example. The first reconciliation table may be a reconciliation summary table and the first reconciliation information may include a summary of the plurality of transactions associated with the unbalanced predetermined purchase order. When the aggregate accrual balance associated with the unique first identifier indicates that the predetermined purchase order is unbalanced, the method may further include a step of loading a second reconciliation table with second reconciliation information. The second reconciliation table may be a reconciliation details table and the second reconciliation information may include information from the plurality of transactions associated with the unbalance predetermined purchase order. The removing step may also remove the second reconciliation information from the second reconciliation table. The loading and removing steps may be operative to maintain only information associated with unbalanced purchase orders in the first reconciliation table. After the aggregate accrual balance is written off, an embodiment of the present invention may include carrying out a step of loading a first persistent write-off table with first write-off information and associating the first write-off information with a unique first write-off identifier. The first persistent write-off table may be a write-off summary table and the first write-off information may include write-off summary information. After the aggregate accrual balance is written-off, an embodiment of the present computer-implemented method may include carrying out a step of loading a second persistent write-off table with second write-off information and associating the second write-off information with the unique first write-off identifier. The second persistent write-off table may be a write-off details table and the second write-off information may include detailed information from the plurality of transactions having caused the predetermined purchase order to become unbalanced. An embodiment of the present invention may further include carrying out a step of enabling reversal of the written-off aggregate accrual balance. After reversal of the written-off aggregate accrual balance, an embodiment of the present method may further include a step of re-loading the removed first reconciliation information into the first reconciliation table. After reversal of the written-off aggregate accrual balance, a first persistent write-off table may be loaded with first write-off reversal information and the first write-off reversal information may be associated with a unique first write-off reversal identifier.

According to another embodiment thereof, the present invention is also a machine-readable medium having data stored thereon representing sequences of instructions which, when executed by a computing device, causes the computing device to manage reconciliation and write-off data in an accrual-based accounting environment by performing the steps of retrieving a plurality of transactions associated with a predetermined purchase order from a database coupled to a computer network; calculating an aggregate accrual balance of the retrieved plurality of transactions and associating the calculated aggregate accrual balance with a unique first identifier. When the aggregate accrual balance associated with the unique first identifier indicates that the predetermined purchase order is unbalanced, an embodiment of the present invention may include a step of loading a first reconciliation table with first reconciliation information and storing the first reconciliation table in the database. An embodiment of the present invention may enable writing-off the aggregate accrual balance, and when the aggregate accrual balance has been written-off, steps of removing the first reconciliation information from the first reconciliation table and storing the first reconciliation table in the database may be carried out.

The present invention, according to a still further embodiment thereof, is a computer system for managing reconciliation and write-off data in an accrual-based accounting environment. Such a computer system may include one or more processors; at least one data storage device coupled to the processor(s) and a plurality of processes spawned by the processor(s). According to an embodiment of the present invention, such processes may include processing logic for retrieving a plurality of transactions associated with a predetermined purchase order from a database coupled to a computer network; calculating an aggregate accrual balance of the retrieved plurality of transactions and associating the calculated aggregate accrual balance with a unique first identifier. When the aggregate accrual balance associated with the unique first identifier indicates that the predetermined purchase order is unbalanced, an embodiment of the present invention may include a step of loading a first reconciliation table with first reconciliation information and storing the first reconciliation table in the database. An embodiment of the present invention may also enable writing-off the aggregate accrual balance, and when the aggregate accrual balance has been written-off, the method may include a step of removing the first reconciliation information from the first reconciliation table and storing the first reconciliation table in the database.

DETAILED DESCRIPTION

Figure 3:
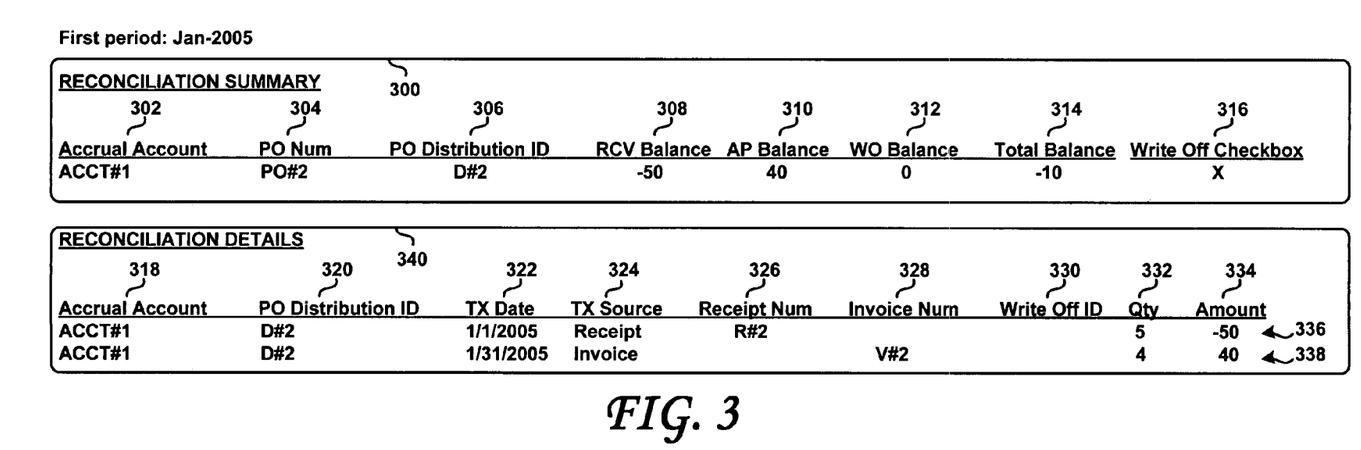
FIG. 3 shows aspects of the methods and systems for managing reconciliation and write-offs in an accrual accounting environment, according to embodiments of the present invention.

FIG. 3 shows aspects of the methods and systems for managing reconciliation and write-offs in an accrual accounting environment, according to embodiments of the present invention. Instead of an ever-growing reconciliation table, embodiments of the present invention envisage the generation of dynamically updating reconciliation and write-off tables that include only that information that is pertinent to transactions that are the subject of reconciliation and write-off. As shown in FIG. 3, embodiments of the present invention may include generating, loading and dynamically managing a Reconciliation Summary Table 300. The Reconciliation Summary Table 300, according to embodiments of the present invention, may be configured such that only unbalanced PO distributions are listed, such that PO distributions that are balanced are not featured in this table. According to embodiments of the present invention, the aggregate accrual balance from several sources such as, for example, Receiving, Accounts Payable and Inventory may be associated, grouped and accessed through the use of a unique first identifier—the PO distribution ID. Use of the PO Distribution ID enables the Reconciliation Summary Table 300 to remain lean, even if a great many transactions are covered by a single PO distribution ID. Continuing with the example developed relative to FIGS. 1 and 2, only purchase order number PO#2 is listed in the Reconciliation Summary Table 300 for the first period (January 2005), as only PO#2 is unbalanced during that period. Consequently and according to embodiments of the present invention (and in contrast with the reconciliation table of FIG. 2), PO#1 is not shown in table 300 because it was self-balancing during the period in question.

As shown in FIG. 3, such a Reconciliation Summary Table 300 may include one or more of the following fields. Those of skill in this art, however, will readily recognize that other fields may also be included in the table 300, in addition to or in place of the fields shown in FIG. 3 and discussed hereunder. The Reconciliation Summary Table 300 may, as shown at 302 in FIG. 3, include a column to identify a specified accrual account. In the example developed herein, the specified accrual account is ACCT#1. The table 300 may also include a column for the PO number, as shown at 304. The PO distribution ID may also be listed in the table 300, at 306. A column to specify the received balance 308 may also be included, to indicate the value of the items received in the accrual account ACCT#1. The invoiced amount may be listed as the Accounts Payable balance, in column 310. In the example developed herein, invoice V#2 was for only $40. Therefore, for PO#2 in the first period under consideration, the AP Balance column 310 lists "40", the amount invoiced on Jan. 31, 2005 (See FIG. 1). The Reconciliation Summary table 300 may also include a Write-Off Balance column, as shown at 312. The Write-Off Balance column 312 may be used to store the current written-off amount for the specified PO distribution ID. In this case, the write-off balance is zero, as PO#2, in the state in which it is shown in FIG. 2, is currently unbalanced and no amounts have been written-off as of yet. This column may be dynamically updated when and if amounts are written off, as is described hereunder. The Summary Reconciliation may also, as shown in FIG. 3 at 314, include a Total Balance column.

The Total Balance column may be configured to store the aggregate accrual balance from many different columns and the sum of potentially many (e.g., hundreds or thousands) transactions. According to an embodiment of the present invention, the aggregate accrual balance stored in the Total Balance column 314 of table 300 may be computed by summing the values stored in the Received Balance column 308, the accounts Payable Balance column 310 and the Write-Off Balance column 312. In the example developed herein, the aggregate accrual balance stored in the Total Balance column 310 is "−10" as columns 308, 310 and 312 store values equal to −50, 40 and 0, respectively. Advantageously, the Reconciliation Summary Table 300 may include a Write-Off Checkbox column 316. It is a simple matter to write off the −10 deficiency shown in column 314 by checking Write-Off Checkbox 316. Checking the Write-Off Checkbox 316 enables the user, in a single action (such as checking a box) to write off amounts from multiple transactions associated with the PO Distribution ID in column 306. According to another embodiment, the writing-off process need not involve any manual input from the user. Indeed, the decision whether to write off any given amount may be codified programmatically and may enable mass write-offs based upon a predetermined tolerance or threshold amount, date, PO range or any other relevant factor. That is, write-off rules may be devised and coded such as to, for example, automatically write-off amounts less than a predetermined amount (e.g., $100) on transactions that have remained unbalanced for over three months. The tables, information and data described herein may be stored in a database such as shown at 1026 in FIG. 10 and accessed over, e.g., a computer network such as, the Internet, a corporate intranet and/or a Virtual Private Network (VPN), for example.

Should the Write-Off Checkbox 316 be checked (or should the aggregate accrual balance stored in the Total Value column 314 be written-off automatically and programmatically) and a given PO be brought into balance, that PO and the information related thereto may be caused to disappear (i.e., may be removed) from the Reconciliation Summary Table 300 and/or Reconciliation Details Table 340 as, according to embodiments of the present invention, only unbalanced PO distributions appear therein. Therefore, the Reconciliation Summary and Details Tables 300, 340 may be configured to dynamically update to only include transactional information related to or associated with unbalanced PO Distribution IDs. The Reconciliation Summary and Details Tables 300, 340 may also be configured to dynamically remove from the tables summaries and details transactions associated with PO Distribution IDs corresponding to purchase orders that have been brought into balance through a reconciliation and write-off process. The Reconciliation Summary and Details Tables 300, 340 may also be configured such that summaries and details of purchase orders that have become unbalanced (for whatever reason) may be dynamically loaded therein.

The Reconciliation Details Table 340, according to embodiments of the present invention, may be configured to only include details (e.g., transactional information) of PO Distribution IDs that are unbalanced. That is, the Reconciliation Details Table 340 may be configured to contain only the details of those transactions associated with the PO Distribution ID(s) that appear in the Reconciliation Summary Table 300. As shown in FIG. 3, only the details of unbalanced PO#2 appear in the Reconciliation Details Table 340. The Reconciliation Details Table 340 may, for example, include columns for the Accrual Account 318, for the PO Distribution ID 320, for the Transaction Date 322, for the Transaction Source 324 (e.g., receipt or invoice), for the Receipt Number 326, for the Invoice Number 328, for the Write-Off ID 330 (e.g., a unique identifier assigned to and associated with each write-off, to enable the write-off to be reversed and to create an auditable record), for the Quantity 332 and for the Amount 334 of the transaction. A greater or lesser number of items of information may be presented in the Reconciliation Details Table 340, as those of skill in this art may readily recognize. Limiting the Reconciliation Tables 300, 340 to only those PO Distribution IDs that are unbalanced advantageously limits the number of transactions that appear therein and presents only that information that is useful to the reconciliation and write-off processes to the user.

Figure 4:
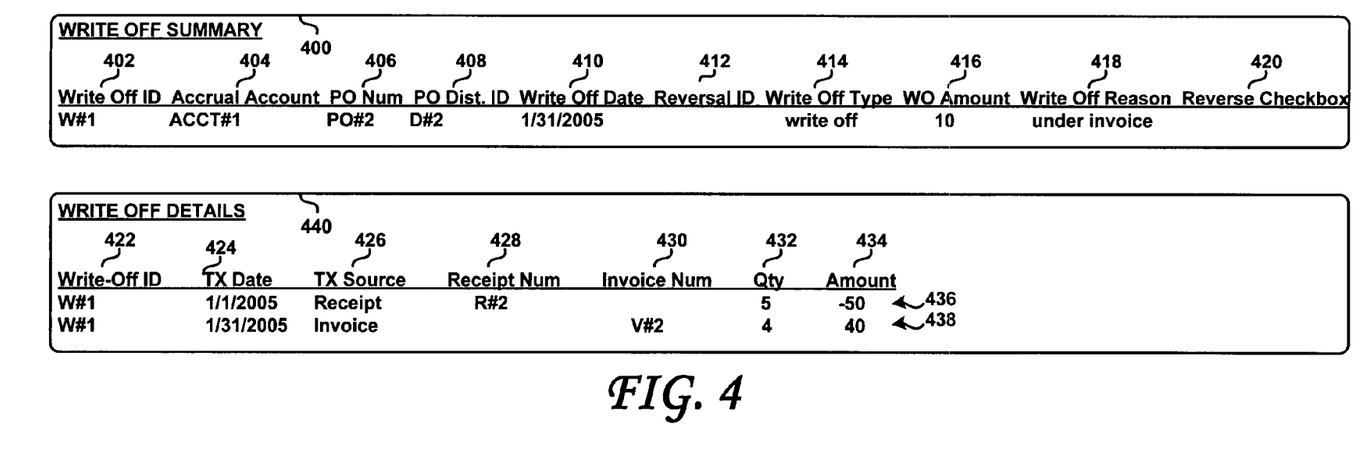
FIG. 4 shows further aspects of the methods and systems for managing reconciliation and write-offs in an accrual accounting environment, according to embodiments of the present invention.

FIG. 4 shows aspects of the methods and systems for managing reconciliation and write-offs in an accrual accounting environment, according to further embodiments of the present invention. Specifically, FIG. 4 shows a Write-Off Summary Table 400 and a Write-Off Details Table 440 according to embodiments of the present invention. As shown, the Write-Off Summary Table 400 may include columns for all or selected items of information that are relevant to the write-off requested by the user or programmatically carried out. For example, the Write-Off Summary Table 400 may include the following columns: Write-Off ID 402 (a unique identifier for each write-off), Accrual Account 404, PO Number 406, the PO Distribution ID 408, the Write-Off Date 410 (the date on which the amount was written-off), the Reversal ID 412 (a unique identifier for each write-off reversal), the Write-Off Type 414, the Write-Off Amount 416, the Write-Off Reason 418 and a Reverse Checkbox 420. As those of skill may recognize, the Write-Off Summary table 400 may be configured differently than shown in FIG. 4. For example, additional, fewer or different fields may be included without departing from the scope of the claimed embodiments.

In the example developed herein, a $10 amount is being written-off (see Columns 314 and 316 in FIG. 3) on Jan. 31, 2005, as shown in column 410. The Write-Off Type 414, in this case, is "write-off" and the write-off reason is "under invoice", as shown by rows 336 and 338 of the Reconciliation Details Table 340, in which it is shown that the accrual Account ACCT#1 was credited with $50 because of receipt number R#2, but debited only $40 because of the under invoicing of invoice number V#2 of Jan. 31, 2005. The Write-Off Details Table 440 may include, for example, columns for the Write-Off ID 422, the Transaction Date 424, the Transaction Source 426, the Receipt Number 428, the Invoice Number 430, the Quantity 432 and the Amount 434.

The Write-Off Details Table 440 may include any and all information that may be useful in preserving the sequence of events that led to the write off (and optionally to any reversals thereof) and creating an audit trail for write-offs. Alternately, the Write-Off Details Table may simply provide the user with information that explains the circumstances (e.g., transactions, dates, reason codes, etc) surrounding the write-off of a particular amount. In the example developed herein, the write-off detailed in the table 440 relates to the write-off having the Write-Off ID of W#1, shown in both the Write-Off Summary and Details Tables 400, 440. The table 440 shows that write-off W#1 was created because five items at $10 each were received on Jan. 1, 2005 and assigned receipt number R#2 as shown at row 436 and that invoice V#2 for 4 items at $10 each was subsequently received on Jan. 31, 2005, under-invoicing the received items by $10, as shown at 438. Both the Write-Off Tables 400 and 440 are, according to embodiments of the present invention, dynamic in nature and are configured to automatically update as amounts are written off, and as (and if) write-offs are reversed.

Figure 5:
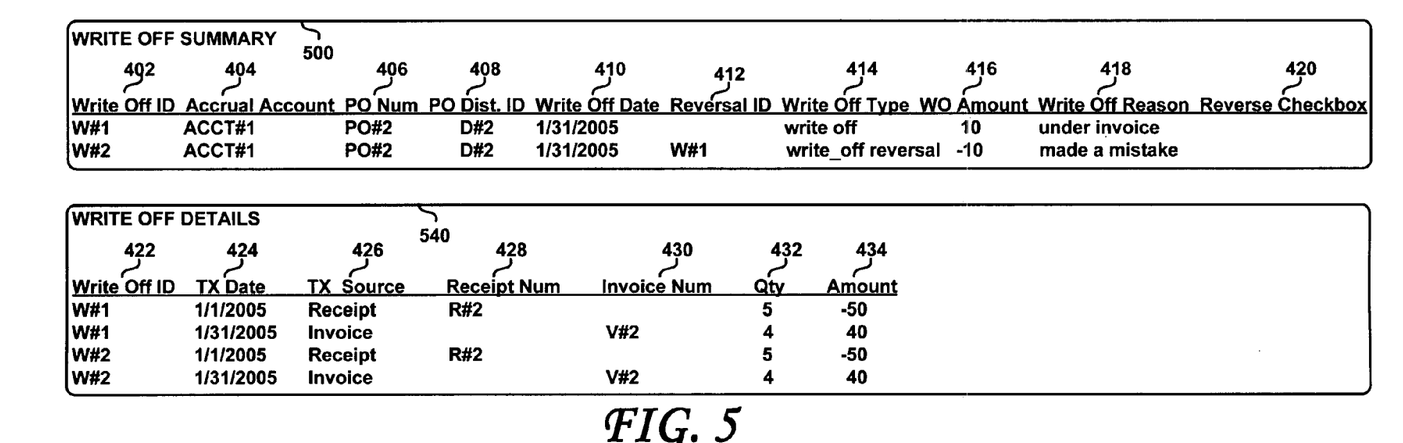
FIG. 5 shows further aspects of the methods and systems for managing reconciliation and write-offs in an accrual accounting environment, according to embodiments of the present invention.

If a write-off was made mistakenly or if a write-off later turns out not to have been necessary, embodiments of the present invention provide a streamlined mechanism for reversing a write-off. To provide such functionality, a Reverse Write-Off Checkbox may be provided, such as shown at column 420 in FIGS. 4 and 5. Had, for example, the Reverse Write-Off Checkbox 420 been checked (FIG. 4 shows the Reverse Write-Off Checkbox 420 of Write-Off ID W#1 as being unchecked), the Write-Off Summary table 500 and the Write-Off Details table 540 may be generated and loaded as shown and described hereunder. As seen in FIG. 5, the Write-Off Summary table 500 and the Write-Off Details table 540 may include the same columns as shown and discussed relative to FIG. 4. When a selected write-off is reversed, the aggregate accrual balance written-off may be credited back to the accrual account, as shown in FIG. 5. In the example developed herein, the PO#2 necessitated a Write-Off Amount of $10. This write-off was assigned Write-Off ID W#1 and the $10 amount was previously debited from the accrual account ACCT#1. Reversing this write-off causes that previously written-off aggregate accrual balance of $10 to be credited back to the ACCT#1 accrual account. The reversal of the write-off may itself be assigned a new Write-Off ID (W#2 in FIG. 5) and the new write-off ID stored in column 402. In this case, the Write-Off Type in column 414 for W#2 may be Write-Off Reversal, and a Write-Off reason may be inputted in column 418, such as "made a mistake" or any other reason for reversing a previously written-off amount. As a result of the reversal of the write-off, the Write-Off Details table 540 of FIG. 5 may show the information for both the original write-off W#1 (e.g., reproduce the rows 436 and 438 of FIG. 4), as well as the details regarding the reversal W#2 of the write-off W#1, reinstating the amounts written-off by W#1 (e.g., Receipt R#2 of Jan. 1, 2005 and invoice V#2 of Jan. 31, 2005), thereby creating an intuitive audit log of such accounting events over time.

Figure 6:
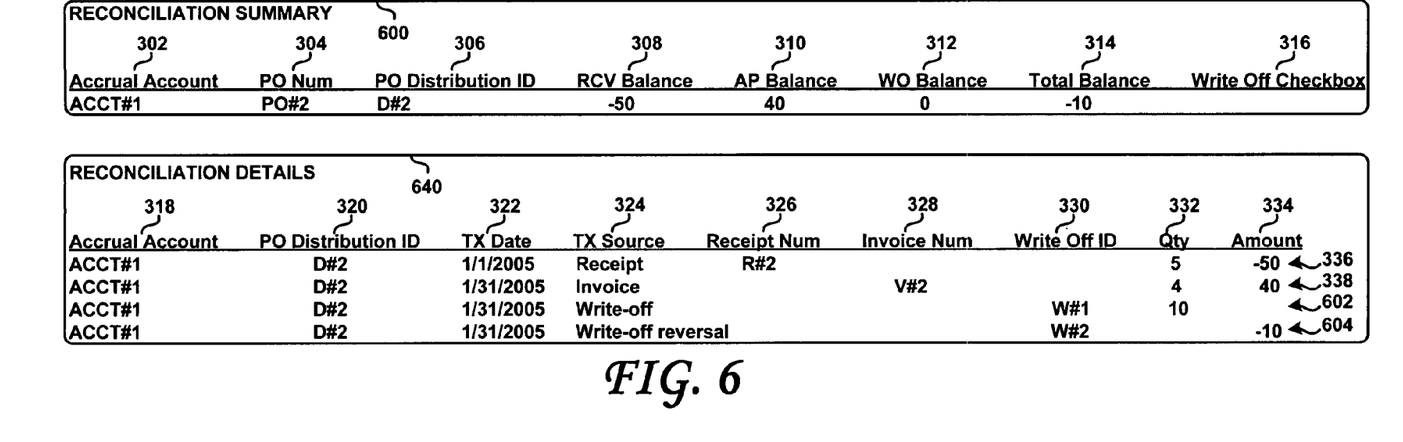
FIG. 6 shows still further aspects of the methods and systems for managing reconciliation and write-offs in an accrual accounting environment, according to embodiments of the present invention.

Recall that the Reconciliation Summary and Details tables, according to embodiments of the present invention, may include only those purchase orders that are unbalanced. In the example being developed herein, PO#2 is once again unbalanced, due to the reversal (W#2) of the $10 written-off by W#1. Therefore, as the present Reconciliation Summary and Details tables are dynamic in nature, PO#2 may again be represented in both the Reconciliation Summary and Details tables 600, 640, as shown in FIG. 6. In this example, reversal of the $10 initially written-off by W#1 reinstates (e.g., reloads) PO#2 to the Reconciliation Summary table 600, which is now identical to that shown in FIG. 3. As tables are updated, they may be stored in the database 1026. As table 600 is a summary table, it is unnecessary to show any write-off or write-off reversal information therein. All that need be represented in the Reconciliation Summary table 600 is that PO#2 is unbalanced, and why (in this case, a received balance of 50 was credited to the ACCT#1 accrual account, but only 40 was debited therefrom), although the table may be configured to store and/or display more or less information than shown, as those of skill may recognize.

The Reconciliation Details table 640, according to embodiments of the present invention may include all of the information to accurately memorialize the sequence transactions that led to the initial state of imbalance of D#2 (R#2 crediting $50 to ACCT#1, V#2 only debiting $40 from ACCT#1 as shown in rows 336, 338), the writing-off of the $10 amount with Write-Off ID W#1 (as seen in row 602), and the subsequent reversal of the write-off with the unique write-off identifier Write-Off ID W#2 (as shown at row 604).

Figure 7:
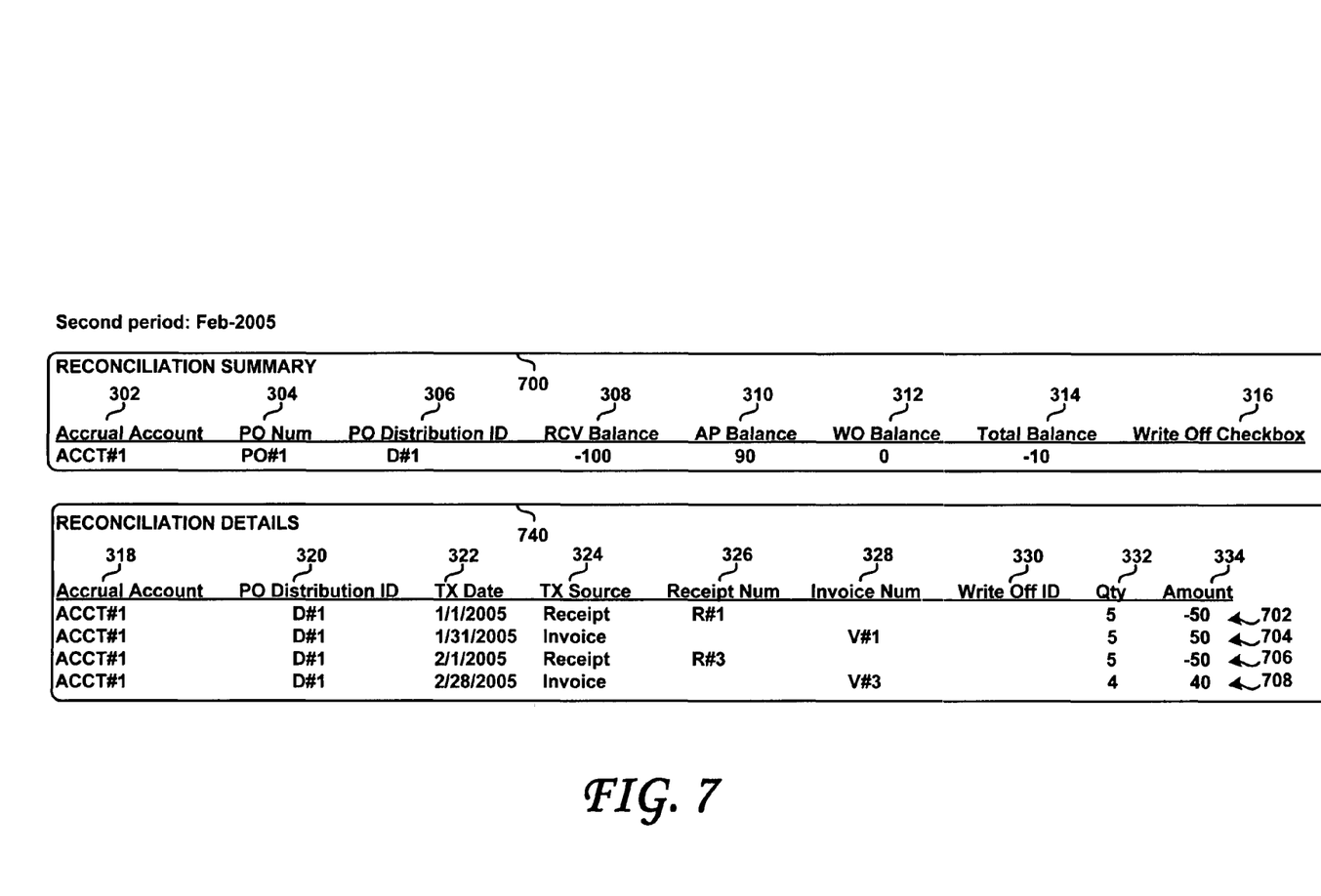
FIG. 7 shows yet further aspects of the methods and systems for managing reconciliation and write-offs in an accrual accounting environment, according to embodiments of the present invention.

FIG. 7 shows Reconciliation Summary table 700 and the Reconciliation Details table 740 for the second period of February 2005, to illustrate further aspects of the dynamic reconciliation and write-off methods according to embodiments of the present invention. In the example developed herein, new transactions were recorded in February 2005 against PO#2, which brought PO#2 into balance. Such new transactions may have included, for example, receipt of the second five items (which would have caused the accrual account ACCT#1 to be credited with 50) and receipt of an over-invoice for 6 items ($60), which would have reduced the value of aggregate accrual balance stored in the Total Balance 314 for PO#2 down to zero, thereby bringing PO#2 into balance (an unbalanced purchase order may be characterized as having an aggregate accrual balance that is non-zero). However, as PO#2 was brought into balance in February 2005 in the illustrative example developed herein, PO#2 no longer shows up in the Reconciliation Summary table 700 or the Reconciliation Details table 740, as these tables are preferably configured to show only unbalanced purchase orders.

As shown in FIG. 7, however, new transactions associated with PO Distribution ID D#1 were recorded against PO#1 which made the (previously balanced) PO#1 unbalanced. Therefore, a summary of the transactions recorded against PO#1 during the second period may be shown in the Reconciliation Summary table 700 and the details of the transactions associated with PO Distribution ID may be stored and shown in the Reconciliation Details table 740. As shown in table 700, the value ($90) stored in the Accounts Payable column 310 is insufficient to balance out the amount (−$100) currently credited to the accrual account ACCT#1, as shown in the Receive Balance column 308. The transactions that gave rise to this imbalance in PO#1 are shown in the Reconciliation Details table 740. Rows 702 and 704 are reproduced from rows 238 and 240, respectively, shown in FIG. 2. These transactions dynamically appear in (i.e., were re-loaded into) the Reconciliation Details table 740 because PO#1 has been made unbalanced by the later-occurring transactions of Feb. 1, 2005 and Feb. 28, 2005. Indeed, on Feb. 1, 2005, five additional items were received and this receipt was assigned Receipt Number R#3. Receipt Number R#3 caused the accrual account ACCT#1 to be credited with $50, as shown at row 706. However, on Feb. 28, 2005, Invoice Number V#3 was received for $40, under-invoicing the five items received on Feb. 1, 2005 by $10. Therefore, the accrual account ACCT#1 was debited only $40, which caused the aggregate accrual balance of −$10 to be stored in the Total Balance column 314.

According to embodiments of the present invention, the data in the Write-Off Summary and Write-Off Details tables is preferably persistent, for at least legal and auditing purposes. With respect to the example developed in the figures, at the end of the second period of February 2005, PO#1 is unbalanced and thus the summary of this imbalance and the transactions that gave rise to the imbalance appear in the Reconciliation tables. PO#2 is balanced and thus does not appear in the Reconciliation tables. However, the write-off transaction (W#1) and the write-off reversal (W#2) that have been performed for PO#2 are persistent in the Write-off tables, as shown in FIG. 5. The $10 amount shown in column 314 in FIG. 7 for PO#1 may be written-off at any time, such as the end of the second period or at some later time. It is unlikely that future transactions will bring PO#1 into balance, as all 10 items called for by PO#1 have been received. However, a later invoice (say V#4) may be received at some later date that would zero out the $10 balance in ACCT#1. It is to be noted that, over time and for most normal businesses, most purchase orders should be self-balanced and write-off should be necessary for only a small number of the issued purchase orders. That the Reconciliation and thus the Write-Off tables only include data regarding unbalanced purchase orders and fact that most purchase orders are self-balanced combine to maintain the Reconciliation tables lean and the Write-Off tables at a manageable size.

Figure 8:
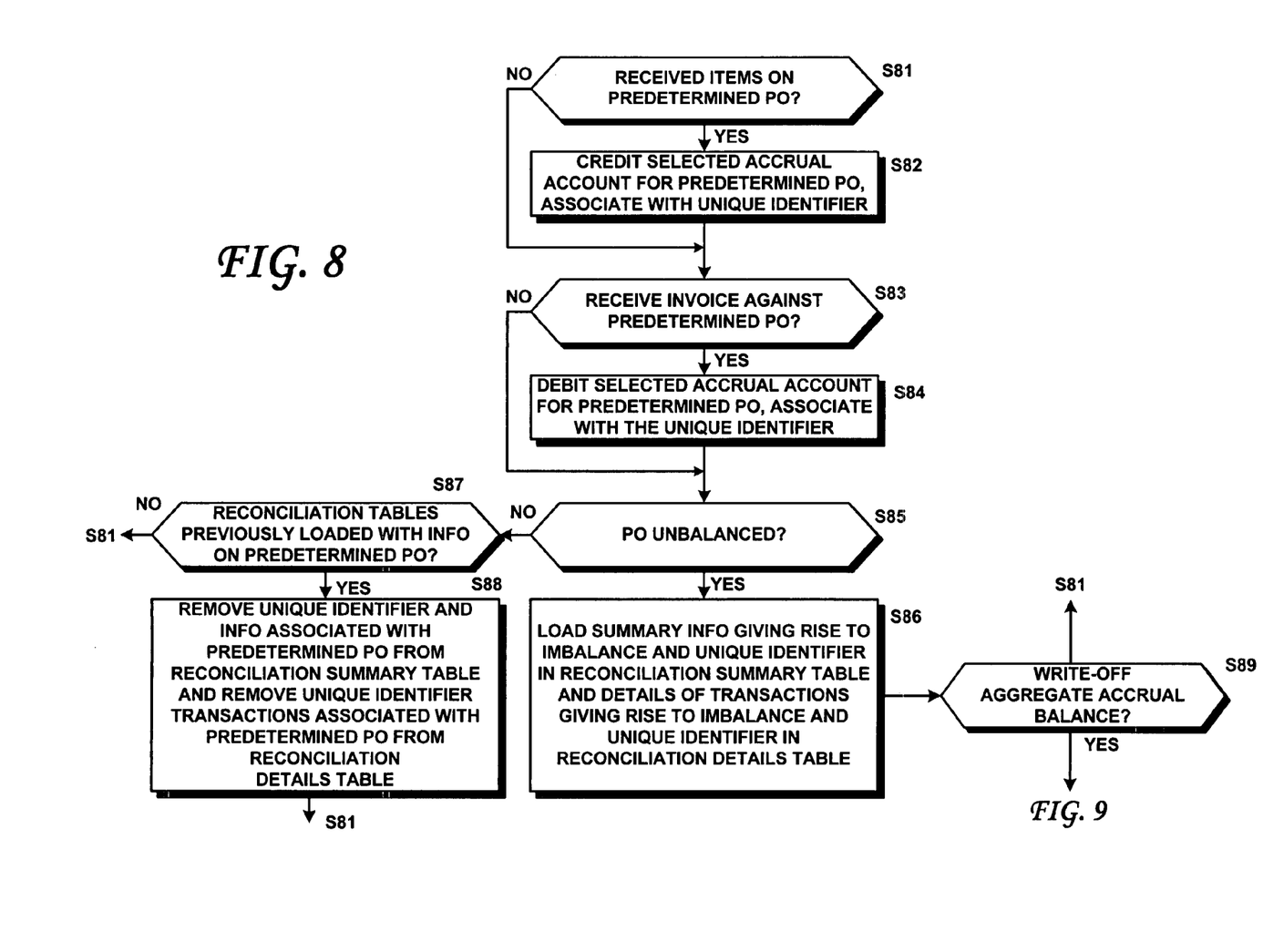
FIG. 8 is a flowchart illustrating an embodiment of the present computer-implemented method for managing reconciliation and write-offs in an accrual accounting environment.
Figure 9:
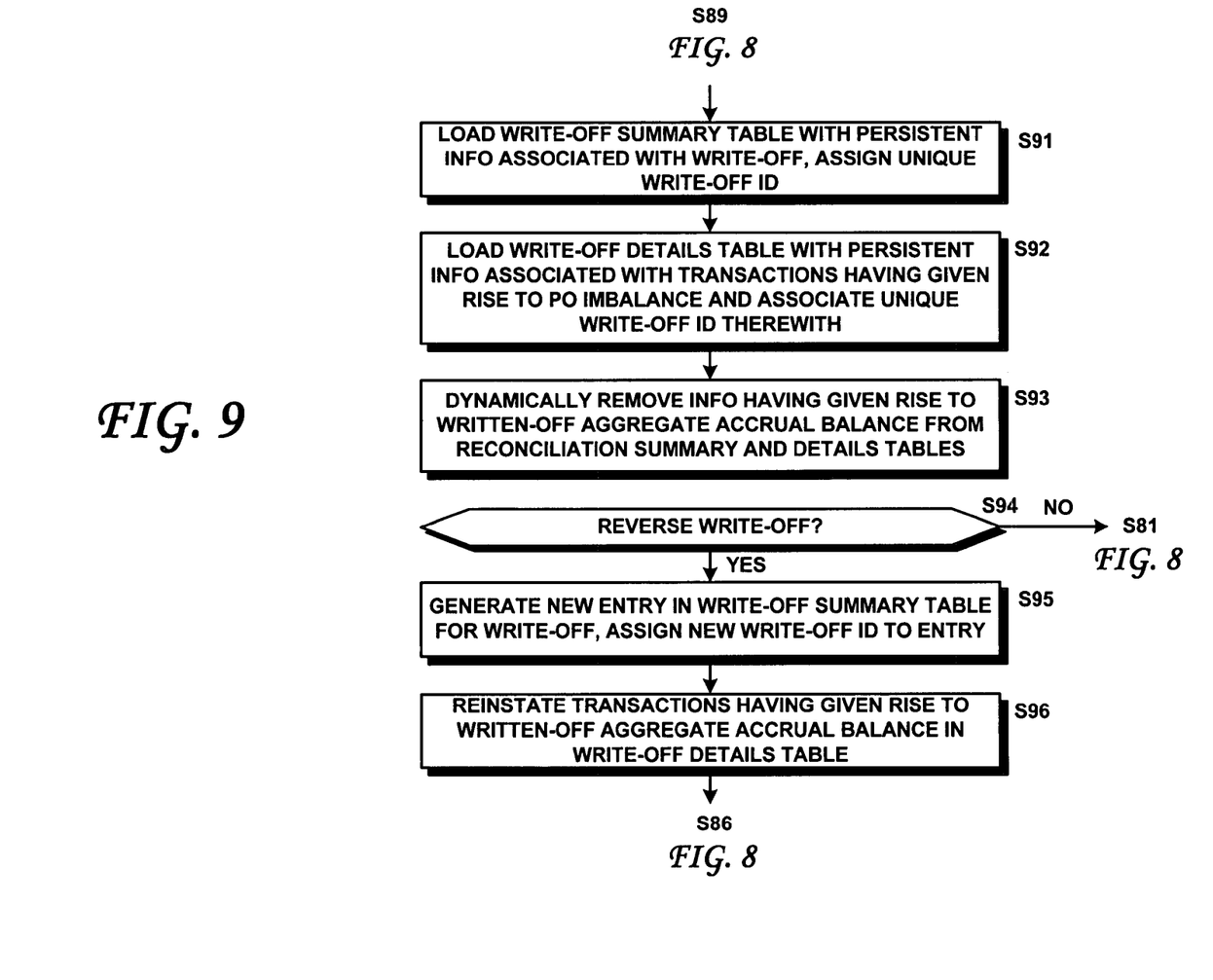
FIG. 9 is another flowchart illustrating further aspects of an embodiment of the present computer-implemented method for managing reconciliation and write-offs in an accrual accounting environment.

FIGS. 8 and 9 are flowcharts that illustrate aspects of the present streamlined accrual reconciliation and write-off process, according to embodiments of the present invention. As shown therein, step S81 calls for a determination as to whether items were received on a predetermined purchase order. If so, a selected accrual account may be credited for the value of the received items (which value is usually specified in the predetermined purchase order), as shown at S82. A unique first identifier (such as the PO Distribution ID discussed herein above, for example) may be associated with any transactions against the predetermined purchase order from, e.g., Receiving, Accounts Payable or Inventory. If no items were received in step S81, the method may proceed to step S83, in which it may be determined whether an invoice has been received (or retrieved from database 1026) against the predetermined purchase order. If so, the selected accrual account is correspondingly debited and that transaction associated with the unique identifier, as shown at S84. If no invoice is received in step S83, it may be determined whether the predetermined purchase order is unbalanced—that is, whether the aggregate accrual balance is non-zero. If the predetermined purchase order is indeed unbalanced as determined at step S85, step S86 may be carried out. Therein, a summary of the information giving rise to the imbalance may be loaded in a first reconciliation table (such as a Reconciliation Summary table, for example) and/or details of the transactions that gave rise to the unbalanced purchase order may be loaded into a second reconciliation table (such as a Reconciliation Details table, for example). Thereafter, at step S89, it may be determined whether the user wishes to write-off the aggregate accrual balance. If the user wishes to write-off the aggregate accrual balance, the steps outlined in FIG. 9 may be carried out, as described in detail hereunder. If the user does not wish to write-off the aggregate accrual balance at step S89 or does not wish to do so at this time, the method may revert back to step S81.

If it is determined in step S85 that that predetermined purchase order is not unbalanced, step S87 may be carried out. As shown in FIG. 8, step S87 calls for determining whether the (first and second or Summary and Details, respectively) reconciliation tables contain previously loaded information of the predetermined purchase order. This may occur, for example, if the non-zero aggregate accrual balance of a previously unbalanced purchase order was written-off but the tables not yet updated. If the reconciliation tables indeed contain previously loaded information of the predetermined purchase order (indicating that the purchase order was previously unbalanced), step S88 may be carried out, in which information associated with the now balanced predetermined purchase order may be removed from the first reconciliation table (e.g., Reconciliation Summary table) and from the second reconciliation table (e.g., Reconciliation Details table). Thereafter, the method may revert to step S81. This removal of information from the reconciliation tables may be carried out dynamically and without any user intervention, as the reconciliation tables are configured, according to embodiments of the present invention, to contain only information associated with unbalanced purchase orders. If step S87 determines that the reconciliation tables have not previously been loaded with information associated with a previously unbalanced purchase order, the method may revert to step S81.

If in step S89 it is determined that the aggregate accrual balance is to be written-off, the steps of FIG. 9 may be carried out. As shown therein, if a non-zero aggregate accrual balance is to be written off, step S91 may be carried out, in which a first persistent write-off table (such as a Write-Off Summary tables 400, 500, for example) may be loaded with persistent first write-off information and the persistent first write-off information may be associated with a unique first write-off identifier (such as W#1 in FIG. 5). Thereafter, as shown at S92, steps may be carried out to load a second persistent write-off table (such as Write-Off Details tables 440, 540 for example) with persistent second write-off information and to associate the second write-off information with the unique first write-off identifier. The second write-off information may include detailed information from the plurality of transactions associated with the unbalanced predetermined purchase order. Because the first and second reconciliation tables loaded in step S86 are dynamic and configured to contain only information associated with unbalanced purchase orders, the information having given rise to the written-off aggregate accrual balance may then be removed from the first and second reconciliation tables, as called for by step S93.

After a write-off has been carried out, embodiments of the present invention enable the user to reverse the write-off. For example, the user may have made a mistake in writing-off the aggregate accrual balance. Alternatively, a new transaction on the predetermined purchase order may have occurred, which later-occurring new transaction may have balanced the predetermined purchase order had the aggregate accrual balance not been previously written off. For whatever reason, if reversal of a previously carried out write-off is desired in step S94, a new entry may be generated in the first persistent write-off table indicating the reversal of the write-off and a new write-off identifier may be associated and stored therewith (as shown at W#2 in FIG. 5), as called for by step S95 and as shown for example, in table 500. The transactions having given rise to the previously removed first reconciliation information (in step S88) may then be reinstated (i.e., re-loaded) back into the first reconciliation table (e.g., any one or both of the Reconciliation Summary and Reconciliation Details tables) as shown at S96, as reversal of the write-off changed the predetermined purchase order from a balanced state to an unbalanced state, thereby necessitating that the Reconciliation tables be dynamically updated. Thereafter, the method may revert back to step S86 in FIG. 8.

Embodiments of the present invention may include computer programs and user interfaces (such as forms and reports) that generate and manage the Reconciliation and Write-Off tables described above and that make the accrual reconciliation and write-off process more efficient and scalable. A form may be provided to enable the user to select which accrual accounts (in the example developed herein, the accrual account is ACCT#1) to be considered in the accrual reconciliation process. An accrual load program may be scheduled to run incrementally with a date range. The data load process carried out by the accrual load program may be re-runnable and dynamic in that only unbalanced PO distributions will have data in the Reconciliation tables and those data may include all historical transactions for that PO distribution ID. This mechanism leads to a lean table and makes the process scalable. After the accrual data is loaded, customizable reports (in summary or detail mode and exportable to, e.g., Microsoft Excel) may be generated to assist in the analysis of the contents thereof and in performing the reconciliation. Filters and the ability to group the data by the outstanding balance, accrual account, PO's aging period days and the like may be provided. Based on such reports, the user may decide to write-off an aggregate accrual balance. Alternatively, such write-off may be carried out programmatically, without any user intervention. For example, rules may be configured to write off aggregate accrual balances that satisfy simple or complex criteria. Since the accounting entries (from whatever source, such as from Receiving, Accounts Payable or Inventory, for example) are grouped together based on a unique first identifier (shown in the figures as the PO Distribution ID), instead of marking each accounting entry as write-off, embodiments of the present invention may calculate the aggregate accrual balance for each PO distribution ID and create a write-off transaction that will offset this aggregate accrual balance. Once this write-off transaction is generated, the PO distribution is balanced and all its associated accounting lines may be removed from the Reconciliation Summary and Details tables. Unlike conventional manual processes, the offset journal entries from the write-off transaction are created automatically and may be assigned a unique write-off identifier, as shown at W#1 in tables 500 and 540 in FIG. 5. The ability to write-off the aggregate accrual balance and the unique write-off identifier make the process efficient, and make mass write-offs possible for large enterprises. For example, the user may define rules to write-off all PO distributions with a low outstanding aggregate accrual balance (say less than $100, for example) in one shot.

According to further embodiments of the present invention, a user may reverse a write-off. The write-off reversal is interrelated with the loading of the Reconciliation Summary and Details tables, in that all historical transactions associated with the unique first identifier (e.g., the PO Distribution ID) may be loaded back into the Reconciliation Details table and reflected in the Reconciliation Summary table. Similar to the write-off process, journal entries for write-off reversal may also be created automatically and identified by a unique write-off reversal identifier, as shown at W#2 in table 640 of FIG. 6.

Figure 10:
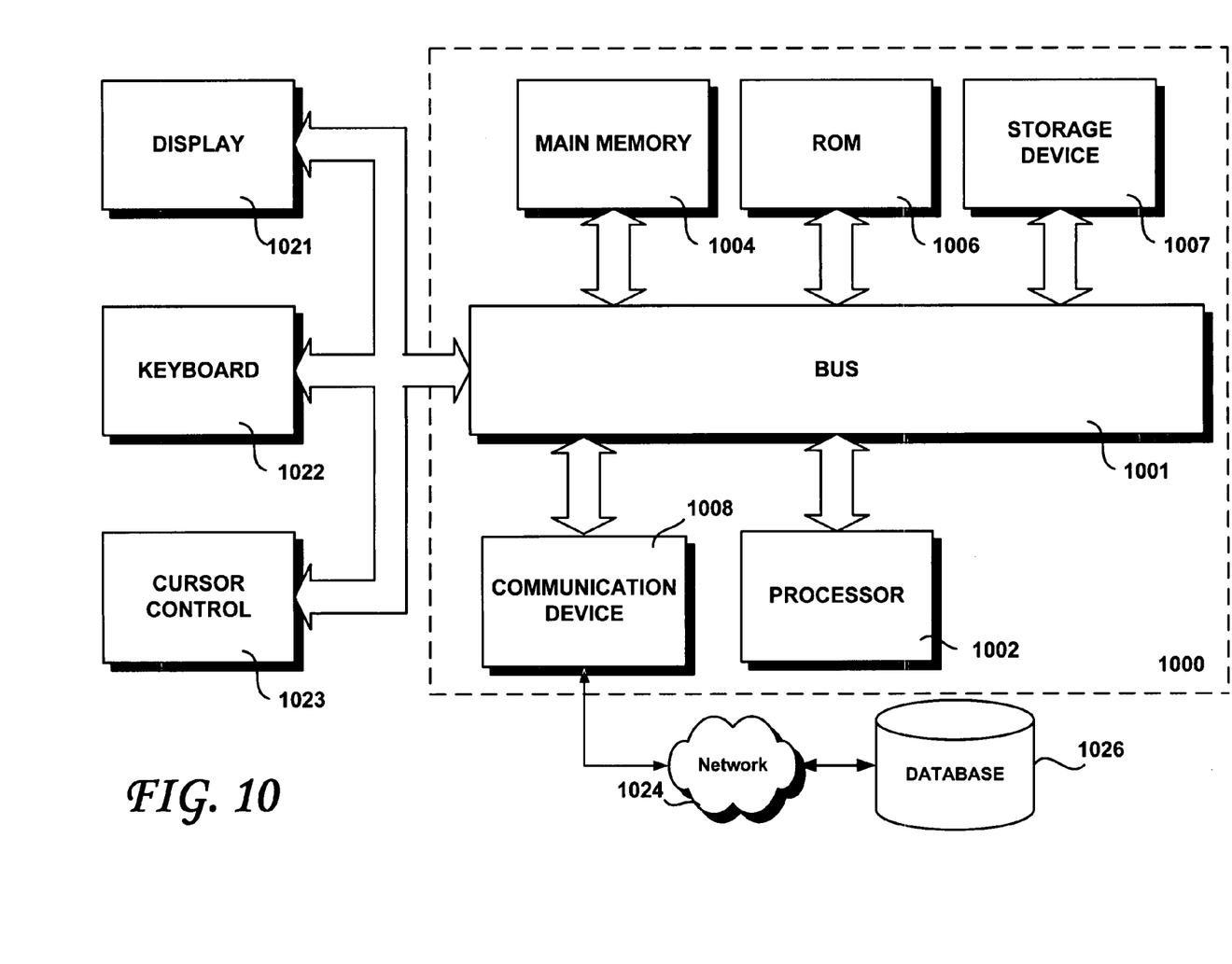
FIG. 10 is a block diagram of a computer system with which embodiments of the present computer-implemented methods for managing reconciliation and write-offs in an accrual accounting environment may be practiced.

FIG. 10 illustrates a block diagram of a computer system 1000 upon which embodiments of the present inventions may be implemented. Computer system 1000 includes a bus 1001 or other communication mechanism for communicating information, and one or more processors 1002 coupled with bus 1001 for processing information. Computer system 1000 further comprises a random access memory (RAM) or other dynamic storage device 1004 (referred to as main memory), coupled to bus 1001 for storing information and instructions to be executed by processor(s) 1002. Main memory 1004 also may be used for storing temporary variables or other intermediate information during execution of instructions by processor 1002. Computer system 1000 also includes a read only memory (ROM) and/or other static storage device 1006 coupled to bus 1001 for storing static information and instructions for processor 1002. A data storage device 1007, such as a magnetic disk or optical disk, may be coupled to bus 1001 for storing information and instructions. The computer system 1000 may also be coupled via the bus 1001 to a display device 1021 for displaying information to a computer user. An alphanumeric input device 1022, including alphanumeric and other keys, may be coupled to bus 1001 for communicating information and command selections to processor(s) 1002. Another type of user input device is cursor control 1023, such as a mouse, a trackball, or cursor direction keys for communicating direction information and command selections to processor 1002 and for controlling cursor movement on display 1021. The computer system 1000 may be coupled, via a network 1024, to a database 1026 configured to store the present reconciliation and write-off data and other information.

Embodiments of the present invention are related to the use of computer system and/or to a plurality of such computer systems to enable methods and systems for managing reconciliation and write-off data in an accrual-based accounting environment. According to one embodiment, the methods and systems described herein may be provided by one or more computer systems 1000 in response to processor(s) 1002 executing sequences of instructions contained in memory 1004. Such instructions may be read into memory 1004 from another computer-readable medium, such as data storage device 1007. Execution of the sequences of instructions contained in memory 1004 causes processor(s) 1002 to perform the steps and have the functionality described herein. In alternative embodiments, hard-wired circuitry may be used in place of or in combination with software instructions to implement the present invention. Thus, the present invention is not limited to any specific combination of hardware circuitry and software. Indeed, it should be understood by those skilled in the art that any suitable computer system may implement the functionality described herein. The computer system may include one or a plurality of microprocessors working to perform the desired functions. In one embodiment, the instructions executed by the microprocessor or microprocessors are operable to cause the microprocessor(s) to perform the steps described herein. The instructions may be stored in any computer-readable medium. In one embodiment, they may be stored on a non-volatile semiconductor memory external to the microprocessor, or integrated with the microprocessor. In another embodiment, the instructions may be stored on a disk and read into a volatile semiconductor memory before execution by the microprocessor.

While the foregoing detailed description has described preferred embodiments of the present invention, it is to be understood that the above description is illustrative only and not limiting of the disclosed invention. Those of skill in this art will recognize other alternative embodiments and all such embodiments are deemed to fall within the scope of the present invention. Thus, the present invention should be limited only by the claims as set forth below.

What is claimed is:

1. A computer-implemented method of managing reconciliation and write-off data in an accrual-based accounting environment, the method comprising:

retrieving, at one or more computer systems, a plurality of transactions associated with a predetermined purchase order from a database in communication with the one or more computer systems;

calculating, with one or more processors associated with the one or more computer systems, an aggregate accrual balance of the retrieved plurality of transactions;

storing, in the database associated with the one or more computer systems, the calculated aggregate accrual balance in association with a unique first reconciliation identifier;

determining, with the one or more processors associated with the one or more computer systems, whether the aggregate accrual balance associated with the unique first reconciliation identifier indicates that the predetermined purchase order is unbalanced;

populating, with the one or more processors associated with the one or more computer systems, a first reconciliation table in the database associated with the one or more computer systems with first reconciliation information when the aggregate accrual balance associated with the unique first reconciliation identifier indicates that the predetermined purchase order is unbalanced;

generating, with the one or more processors associated with the one or more computer systems, information configured for displaying the first reconciliation information from the first reconciliation table together with first functionality enabling writing-off the aggregate accrual balance associated with the unique first reconciliation identifier;

determining, with the one or more processors associated with the one or more computer systems, whether the first functionality indicates that the aggregate accrual balance associated with the unique identifier has been written-off; and updating the first reconciliation table in the database associated with the one or more computer systems in response to removing the first reconciliation information from the first reconciliation table when the first functionality indicates that the aggregate accrual balance associated with the unique first reconciliation identifier has been written-off.

2. A non-transitory machine-readable medium having data stored thereon representing sequences of instructions which, when executed by a computing device, causes the computing device to manage reconciliation and write-off data in an accrual-based accounting environment, the machine-readable medium comprising:

code for retrieving a plurality of transactions associated with a predetermined purchase order from a database;

code for calculating an aggregate accrual balance of the retrieved plurality of transactions;

code for storing the calculated aggregate accrual balance in the database in association with a unique first reconciliation identifier;

code for determining whether the aggregate accrual balance associated with the unique first reconciliation identifier indicates that the predetermined purchase order is unbalanced;

code for populating a first reconciliation table in the database with first reconciliation information when the aggregate accrual balance associated with the unique first reconciliation identifier indicates that the predetermined purchase order is unbalanced;

code for generating information configured for displaying the first reconciliation information from the first reconciliation table together with first functionality enabling writing-off the aggregate accrual balance;

code for determining whether the first functionality indicates that the aggregate accrual balance has been written-off; and code for updating the first reconciliation table in the database in response to removing the first reconciliation information from the first reconciliation table when the first functionality indicates that the aggregate accrual balance associated with the unique first reconciliation identifier has been written-off.

3. The non-transitory machine-readable medium of claim 2, wherein the plurality of transactions originate from at least some of Receiving, Accounts Payable and Inventory.

4. The non-transitory machine-readable medium of claim 2, wherein the code for populating the first reconciliation table comprises code for generating a reconciliation summary table in the database and wherein the first reconciliation information includes a summary of the plurality of transactions associated with the unbalanced predetermined purchase order.

5. The non-transitory machine-readable medium of claim 2, further comprising code for populating a second reconciliation table in the database with second reconciliation information.

6. The non-transitory machine-readable medium of claim 5, wherein the code for populating the second reconciliation table comprises code for generating a reconciliation details table and wherein the second reconciliation information includes detailed information from the plurality of transactions associated with the unbalance predetermined purchase order.

7. The non-transitory machine-readable medium of claim 6, wherein the code for updating the first reconciliation table in the database in response to removing the first reconciliation information from the first reconciliation table when the first functionality indicates that the aggregate accrual balance associated with the unique first reconciliation identifier has been written-off further comprises code for updating the second reconciliation table in the database response to removing the second reconciliation information from the second reconciliation table.

8. The non-transitory machine-readable medium of claim 2, wherein only information associated with unbalanced purchase orders is maintained in the first reconciliation table.

9. The non-transitory machine-readable medium of claim 2, further comprising:

code for populating a first persistent write-off table in the database with first write-off information; and code for storing the first write-off information in the database in association with a unique first write-off identifier.

10. The non-transitory machine-readable medium of claim 9, wherein the code for populating the first persistent write-off table comprises code for generating a write-off summary table and wherein the first write-off information includes write-off summary information.

11. The non-transitory machine-readable medium of claim 9, further comprising:

code for populating a second persistent write-off table in the database with second write-off information; and code for storing the second write-off information in the database in association with the unique first write-off identifier.

12. The non-transitory machine-readable medium of claim 11, wherein the code for populating the second persistent write-off table comprises code for generating a write-off details table and wherein the second write-off information includes detailed information from the plurality of transactions having caused the predetermined purchase order to become unbalanced.

13. The non-transitory machine-readable medium of claim 2, further comprising code for generating information configured for displaying the first reconciliation information from the first reconciliation table together with second functionality enabling reversal of the written-off aggregate accrual balance.

14. The non-transitory machine-readable medium of claim 13, further comprising code for re-populating the removed first reconciliation information into the first reconciliation table in the database when the second functionality indicates reversal of the written-off aggregate accrual balance.

15. The non-transitory machine-readable medium of claim 13, further comprising:

code for populating a first persistent write-off table in the database with first write-off reversal information; and code for storing the first write-off reversal information in the database in association with a unique first write-off reversal identifier.

16. The non-transitory machine-readable medium of claim 2, further comprising code for generating customizable report of the first reconciliation information.

17. The non-transitory machine-readable medium of claim 16, wherein the customizable report is in summary or detail mode.

18. A computer system for managing reconciliation and write-off data in an accrual-based accounting environment, the computer system comprising:
- at least one processor; and
- at least one data storage device coupled to the at least one processor and configured to store a plurality of processor-executable instructions including processing logic for:
  - retrieving a plurality of transactions associated with a predetermined purchase order from a database;
  - calculating an aggregate accrual balance of the retrieved plurality of transactions;
  - storing the calculated aggregate accrual balance in the database in association with a unique first reconciliation identifier;
  - determining whether the aggregate accrual balance associated with the unique first reconciliation identifier indicates that the predetermined purchase order is unbalanced
  - populating a first reconciliation table in the database with first reconciliation information when the aggregate accrual balance associated with the unique first reconciliation identifier indicates that the predetermined purchase order is unbalanced;
  - generating information configured for displaying the first reconciliation information from the first reconciliation table together with first functionality enabling writing-off the aggregate accrual balance;
  - determining whether the first functionality indicates that the aggregate accrual balance has been written-off; and
  - updating the first reconciliation table in the database in response to removing the first reconciliation information from the first reconciliation table when the first functionality indicates that the aggregate accrual balance associated with the unique first reconciliation identifier has been written-off.

* * * * *